United States Patent [19]
Bricker

[11] 3,889,790
[45] June 17, 1975

[54] GEAR CLUTCHES WITH SELECTOR VALVE

[75] Inventor: Norman C. Bricker, Courtenay, Canada

[73] Assignee: The Raymond Lee Organization, Inc., New York, N.Y.

[22] Filed: Aug. 8, 1973

[21] Appl. No.: 386,760

[52] U.S. Cl............ 192/85 AT; 192/87.18; 192/71; 74/364
[51] Int. Cl............................................. F16d 25/10
[58] Field of Search........ 192/85 AT, 71, 74, 87.15, 192/87.18, 87.19; 74/364, 372

[56] References Cited
UNITED STATES PATENTS

| | | | |
|---|---|---|---|
| 796,990 | 8/1905 | Enrico | 192/87.15 |
| 919,101 | 4/1909 | Whaley | 192/71 |
| 1,596,192 | 8/1926 | Knapp | 192/71 X |
| 1,818,910 | 8/1931 | Sanine | 192/71 X |
| 2,286,585 | 6/1942 | Simpson | 192/85 AT |

*Primary Examiner*—Benjamin W. Wyche
*Attorney, Agent, or Firm*—Daniel Jay Tick

[57] ABSTRACT

A transmission system comprises a substantially tubular drive shaft having a plurality of spaced keys mounted thereon. A driven shaft is positioned in operative proximity with the drive shaft and substantially in parallel therewith. A plurality of spaced annular drive gears are coaxially freely positioned around the drive shaft. Each of the drive gears is positioned in operative proximity with a corresponding one of the keys. A plurality of spaced driven gears are mounted on the driven shaft and are rotatable therewith. Each of the driven gears is drivingly coupled to a corresponding one of the drive gears. A control device in the drive shaft selectively moves each of the keys into and out of engagement with the corresponding drive gears.

2 Claims, 6 Drawing Figures

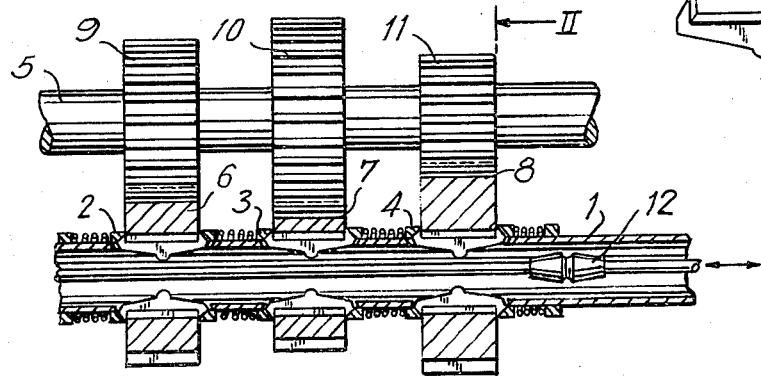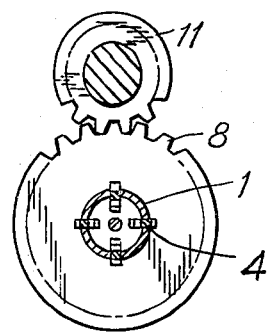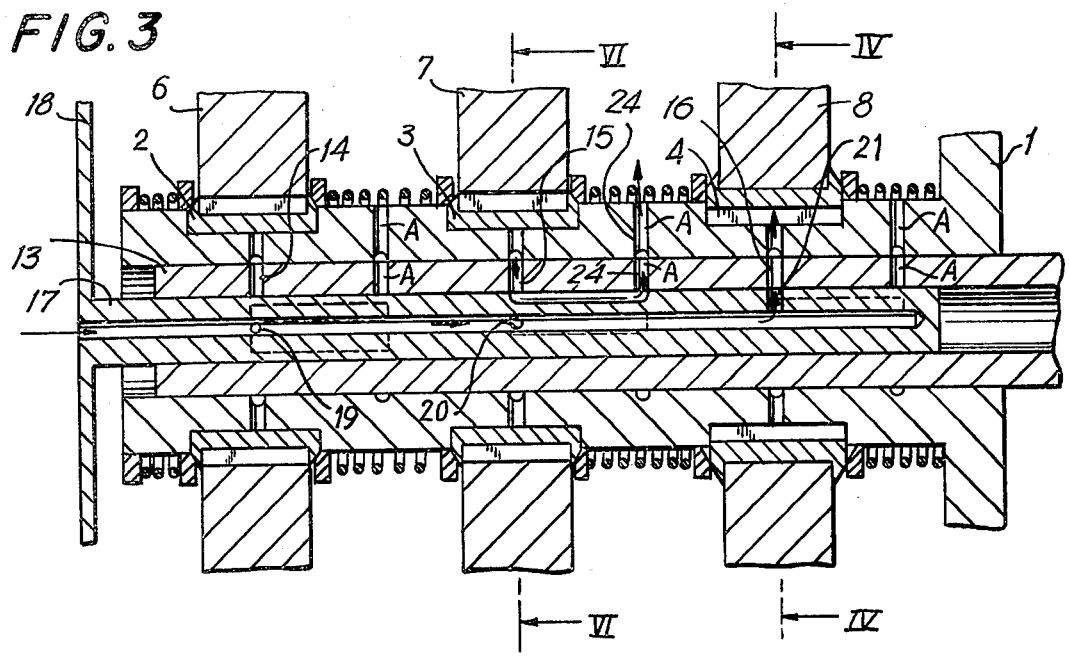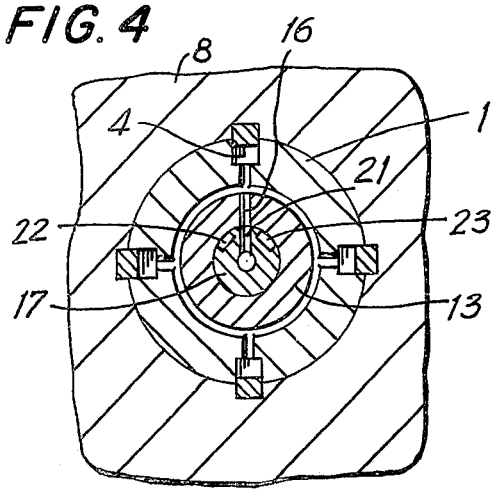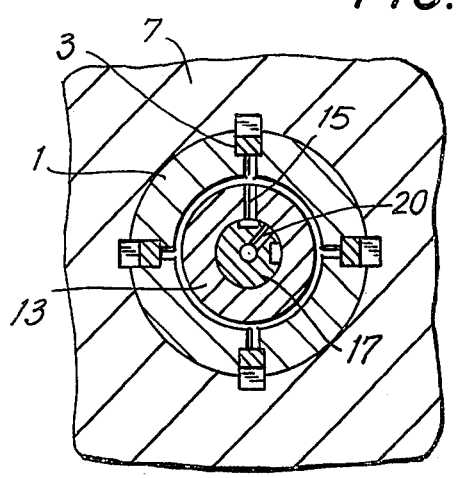

GEAR CLUTCHES WITH SELECTOR VALVE

DESCRIPTION OF THE INVENTION

The present invention relates to a transmission system.

Objects of the invention are to provide a transmission system of simple structure, which is inexpensive in manufacture, and which functions with efficiency, effectiveness and reliability.

In order that the invention may be readily carried into effect, it will now be described with reference to the accompanying drawing, wherein:

FIG. 1 is a side view, partly in section, of an embodiment of the transmission system of the invention;

FIG. 2 is a cross-sectional view of the embodiment of FIG. 1, taken along the lines II—II, of FIG. 1;

FIG. 3 is a sectional view of another embodiment of the transmission system of the invention;

FIG. 4 is a cross-sectional view of the embodiment of FIG. 3, taken along the lines IV—IV, of FIG. 3;

FIG. 5 is a schematic diagram of a key of the transmission system of the invention; and FIG. 6 is a cross-sectional view of the embodiment of FIG. 3, taken along the lines VI—VI, of FIG. 3.

In the FIGS., the same components are identified by the same reference numerals.

The transmission system of the invention comprises a substantially tubular drive shaft 1 having a plurality of spaced keys 2, 3, 4, and so on, mounted thereon.

A driven shaft 5 (FIG. 1) is positioned in operative proximity with the drive shaft 1 and is positioned substantially in parallel with said drive shaft.

A plurality of spaced annular drive gears 6, 7, 8, and so on, are coaxially freely positioned around the drive shaft 1. Each of the drive gears 6, 7, 8, and so on, is positioned in operative proximity with a corresponding one of the keys 2, 3, 4, and so on.

A plurality of spaced driven gears 9, 10, 11, and so on, are mounted on the driven shaft 5 and are rotatable therewith. Each of the driven gears 9, 10, 11, and so on, is drivingly coupled to a corresponding one of the drive gears 6, 7, 8, and so on.

A control system is provided, in accordance with the invention, in the drive shaft 1, for selectively moving each of the keys 2, 3, 4, and so on, into and out of engagement with the corresponding drive gears 6, 7, 8, and so on.

In the embodiment of FIGS. 1 and 2, the control system comprises a plunger 12 coaxially mounted inside the drive shaft 1. The plunger 12 selectively urges a desired one of the keys 2, 3, 4, and so on, into engagement with the corresponding drive gear 6, 7, 8, and so on, thereby rotating the drive gear with the drive shaft. The control system also functions to release a key from engagement with the corresponding drive gear each time the gears are to be shifted.

In the embodiment of FIGS. 3 and 4, the control system comprises a sleeve 13 having a plurality of valve holes 14, 15, 16, and so on, formed therethrough. The sleeve 13 is coaxially positioned inside the drive shaft 1. Each valve hole corresponds in position to a corresponding one of the keys 2, 3, 4, and so on. A pressure tube 17 is coaxially positioned inside the sleeve 13. The pressure tube is affixed at one end to the transmission case 18 of the transmission system.

The pressure tube 17 has a plurality of holes 19, 20, 21, and so on, formed therethrough. Oil, or suitable fluid, under pressure is provided in the pressure tube 17. Each hole 19, 20, 21, and so on, of the pressure tube corresponds in position to a corresponding hole 14, 15, 16, and so on, of the sleeve 13. Any suitable rotating arrangement such as, for example, a mechanical linkage to a gear shift lever, selectively rotates the sleeve 13 to align a desired hole 19, 20, 21, and so on, of the pressure tube 17 with a desired hole 14, 15, 16, and so on, of the sleeve for selectively urging a desired one of the keys into engagement with the corresponding drive gear 6, 7, 8, and so on, through the ring groove in the drive shaft 1 thereby rotating the drive gear with the drive shaft 1.

The control system of the embodiment of FIGS. 3 and 4 further comprises axially extending release grooves 22 and 23 (FIG. 4) formed in the pressure tube 17 on each side of each of the holes 19, 20, 21, and so on, formed therethrough, for directing oil or fluid to the gear case of the transmission system to release the key from engagement with the corresponding drive gear.

While the invention has been described by means of specific examples and in specific embodiments, I do not wish to be limited thereto, for obvious modifications will occur to those skilled in the art without departing from the spirit and scope of the invention.

I claim:

1. A transmission system, comprising
a substantially tubular drive shaft having a plurality of spaced keys mounted thereon;
a driven shaft in operative proximity with the drive shaft and positioned substantially in parallel therewith;
a plurality of spaced annular drive gears coaxially freely positioned around the drive shaft, each of the drive gears being positioned in operative proximity with a corresponding one of the keys;
a plurality of spaced driven gears mounted on the driven shaft and rotatable therewith, each of the driven gears being drivingly coupled to a corresponding one of the drive gears;
a transmission case; and
control means in the drive shaft for selectively moving each of the keys into and out of engagement with the corresponding drive gears, the control means comprising
a sleeve having a plurality of valve holes formed therethrough coaxially positioned inside the drive shaft, each hole corresponding in position to a corresponding one of the keys, and a pressure tube coaxially positioned inside the sleeve, said pressure tube being affixed at one end to the transmission case and having a plurality of holes formed therethrough and oil under pressure therein, each hole of the pressure tube corresponding in position to a corresponding hole of the sleeve, and rotating means for selectively rotating the sleeve to align a desired hole of the sleeve with a desired hole of the pressure tube for selectively urging a desired one of the keys into engagement with the corresponding drive gear thereby rotating the drive gear with the drive shaft.

2. A transmission system as claimed in claim 1, further comprising a gear case, and wherein the control means further comprises release grooves formed in the pressure tube on each side of the holes formed therethrough for directing oil to the gear case to release the key from engagement with the drive gear.

* * * * *